(12) United States Patent
Kondis et al.

(10) Patent No.: US 6,693,745 B1
(45) Date of Patent: Feb. 17, 2004

(54) ATHERMAL AND HIGH THROUGHPUT GRATINGS

(75) Inventors: John P. Kondis, Costa Mesa, CA (US); Bradley A. Scott, Huntington Beach, CA (US); William Leon DeBoynton, Santa Ana, CA (US); John F. Filhaber, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/537,977

(22) Filed: Mar. 28, 2000

Related U.S. Application Data
(60) Provisional application No. 60/153,913, filed on Sep. 14, 1999.

(51) Int. Cl.$^7$ .............................. G02B 27/44; G02B 5/18
(52) U.S. Cl. ...................... 359/569; 359/566; 359/571
(58) Field of Search .................. 359/565, 566, 359/572, 569, 571, 196

(56) References Cited

U.S. PATENT DOCUMENTS

| | | | |
|---|---|---|---|
| 4,338,012 A | 7/1982 | Matsumura et al. | 354/200 |
| 4,475,792 A | 10/1984 | Sica, Jr. | |
| 4,490,021 A | 12/1984 | Moya | |
| 4,539,475 A | 9/1985 | Bosse | |
| 4,759,616 A | 7/1988 | Marchant | |
| 4,874,941 A | 10/1989 | Spillman Jr. | 250/237 G |
| 4,890,899 A | 1/1990 | Aoki et al. | |
| 5,007,709 A | 4/1991 | Iida et al. | |
| 5,066,101 A | 11/1991 | Aoki et al. | |
| 5,260,828 A | 11/1993 | Londono et al. | 359/565 |
| 5,420,947 A | 5/1995 | Li et al. | 385/37 |
| 5,457,573 A | 10/1995 | Iida et al. | |
| 5,652,681 A | 7/1997 | Chen et al. | 359/831 |
| 5,691,847 A | 11/1997 | Chen | 359/565 |
| 5,745,289 A | 4/1998 | Hamblen | 359/565 |
| 5,812,320 A | 9/1998 | Maeda | 359/569 |
| 6,134,039 A | * 10/2000 | Rudeen | 359/196 |

FOREIGN PATENT DOCUMENTS

EP 0890855 A 1/1999

OTHER PUBLICATIONS

Senior JM et al.—"Devices for Wavelength Multiplexing and Demultiplexing" IEE Proceedings J. Optoelectronics, GB, Institution of Electrical Engineers. Stevenage, vol. 136 No. 3 Part J, Jun. 1, 1989, pp. 183–292, XP000119571.

* cited by examiner

*Primary Examiner*—Audrey Chang
(74) *Attorney, Agent, or Firm*—Knobbe, Martens, Olson & Bear, LLP (57) ABSTRACT

A light dispersing device for dispersing a polychromatic input beam into a plurality of narrow-band output beams such that the output beams are directed in a wavelength dependent manner and such that the directions of the output beams are less affected by a change in temperature. The preferred embodiment of the device comprises a diffraction grating mounted to a surface of a prism. The grating and prism have dispersing characteristics that make the output of the device substantially insensitive to a change in temperature. In one embodiment, the device is adapted to reduce the angles between the input beam and the output beams at the grating, and thereby improve throughput efficiency.

35 Claims, 5 Drawing Sheets

ATHERMAL AND HIGH THROUGHPUT GRATINGS

RELATED APPLICATIONS

This application claims the benefit of U.S. Provisional Application No. 60/153,913, filed on Sep. 14, 1999 and is hereby incorporated by reference in its entirety.

BACKGROUND OF THE INVENTION

1. Field of the Invention

The present invention relates to light dispersing devices and, in particular, relates to a thermally compensated light dispersing device utilizing a diffraction grating.

2. Description of the Related Art

Dispersing devices are often used in science and industry to separate beams of electromagnetic radiation, or light beams, according to wavelength. In particular, such devices are adapted to receive a polychromatic input light beam having a relatively large combined spectral bandwidth and convert the input beam into a plurality of constituent output light beams having relatively narrow bandwidths. The output beams exit the dispersing device with wavelength dependent directions so as to allow subsequent processing of individual wavelength components of the input beam.

One type of light dispersing device is a diffraction grating. The typical diffraction grating comprises a planar substrate and a relatively thin contoured layer formed on the substrate such that a contoured outer surface of the contoured layer defines a plurality of narrow grooves or slits. In the case of a reflection type grating, the contoured layer is formed of material having a high reflectivity so that light impinging the contoured surface is reflected therefrom. In the case of a transmission type grating, the contoured surface is provided with a low reflectivity and the substrate is formed of light transparent material so that light impinging the contoured surface is transmitted through the grating.

Thus, when a polychromatic incident light beam having a generally planar wavefront impinges on the contoured surface of the typical grating, a wavelet having a spherical wavefront is emitted from each of the grooves of the grating. As the wavelets travel away from the grating, they overlap and interfere with each other so as to provide a plurality of substantially monochromatic diffracted beams having wavelength dependent directions. Since the spectral bandwidth of the output beams is dependent on the number of grooves of the grating and since the contoured surface of the typical grating usually comprises a high density of grooves per unit length, the output beams are often provided with relatively narrow spectral bandwidths.

Mathematically, the dispersing characteristics of the diffraction grating are defined by the equation $$s(\sin \theta_i \pm \sin \theta_m) = m\lambda \quad (1)$$

wherein s is the groove spacing of the grating, $\lambda$ is the wavelength of the output beam, $\theta_i$ is the incident angle of the input beam with respect to a line normal to the plane of the grating, $\theta_m$ is the outgoing or diffraction angle of each output beam with respect to the line normal to the grating, m, otherwise known as the order of interference, can take any integer value, and wherein the plus sign applies to reflection-type gratings and the minus sign applies to transmission type gratings. Furthermore, the wavelength $\lambda$ of the output beam is defined by the equation $$\lambda = \frac{\lambda_f}{n_{medium}} \quad (2)$$

wherein $\lambda_f$, otherwise known as the free space wavelength, is the wavelength of the diffracted beam in a vacuum, and $n_{medium}$ is the index of refraction of the medium in which the diffracted beam is traveling.

However, diffraction gratings known in the art often provide unstable dispersing characteristics that vary in response to a changing temperature. In particular, the groove spacing s is often affected by a change in temperature due primarily to the substrate of the grating having a non-zero coefficient of thermal expansion (CTE). Because the groove spacing is defined by the shape of the contoured surface and because the contoured layer is physically in contact with the substrate, the groove spacing s can change in response to expansion or contraction of the substrate. Since the groove spacing affects the dispersive characteristics of the grating according to equation (1), the dispersing characteristics of the typical diffraction grating may vary in a temperature dependent manner.

Another problem associated with typical diffraction gratings is that it is usually difficult to realize their theoretical maximum efficiency. In particular, the efficiency of a reflection-type grating is increased when the input and output beams are substantially aligned with each other. However, additional constraints imposed by the necessity of positioning additional elements adjacent the grating require the output beams to be angularly separated from the input beam with relatively large angles defined therebetween.

For example, in some configurations, a lens is often required to be positioned in the path of the input beam prior to the grating so as to collimate the input beam. Furthermore, spatial constraints may require the input lens to be positioned adjacent the grating. To prevent the input lens from distorting the output beams, the output beams are required to define relatively large angles with respect to the input beam. Consequently, the typical grating often provides less than optimal performance.

A prism is another type of dispersing device that is often used to extract narrow-band light beams from a polychromatic input beam. The typical prism utilizes non-parallel refracting input and output surfaces in conjunction with a transparent medium having a wavelength dependent index of refraction to provide the desired dispersing characteristics. Light entering and exiting each refracting surface of the prism is refracted according to Snell's Law of refraction which can be expressed mathematically by the equation:

$$n_i \sin \theta_i = n_r \sin \theta_r \quad (3)$$

wherein $n_i$ is the index of refraction of an incident medium, $\theta_i$ is the incident angle of the incident beam defined with respect to a line perpendicular to the refracting surface, $n_r$ is the index of refraction of the refracting medium adjacent the incident medium, and $\theta_r$ is the refracted angle of the refracted beam. Because the index of refraction of the prism is dependent on the free space wavelength of light traveling therethrough, light exiting the output surface does so with a wavelength dependent direction. However, since the index of refraction of the typical prism usually varies with a change in temperature in a substantial manner, the dispersing characteristics of the prism are also relatively unstable and vary in response to a change in temperature.

Another type of dispersing device combines a diffraction grating and a prism so as to form what is otherwise known as a "grism". One advantage of the grism is that it provides convenient mounting surfaces for facilitating alignment of the grism within an optical system. Furthermore, as described in U.S. Pat. No. 5,652,681 to Chen et al., the grism can be adapted to provide improved resolving power, such that the device is able to disperse finely spaced wavelength components with increased angular separation over a larger spectral range. However, because the groove spacing of the typical diffraction grating and the index of refraction of the typical prism are both adversely affected by a change in temperature, the dispersive characteristics of the typical grism are especially sensitive to a change in temperature.

From the foregoing, therefore, it will be appreciated that there is a need for an improved light dispersing device with dispersing characteristics that are more stable with respect to temperature. Furthermore, there is a need for a dispersing device with increased throughput efficiency.

SUMMARY OF THE INVENTION

The aforementioned needs are satisfied by the present invention which, in one aspect, comprises a dispersing apparatus having an input face, a diffracting element, and an output face. The input face refracts light at angles which vary with temperature. The diffracting element compensates for these angular variations such that light exits the dispersing apparatus refracted at angles that are substantially independent of the angular variations of the input face.

In one embodiment, light entering the dispersing apparatus is a polychromatic light beam and said light exiting the dispersing apparatus is a plurality of narrow-band output light beams. The input and output faces are preferably formed by a prism, and said diffracting element preferably has a diffracting face. Furthermore, the diffracting element is preferably a diffraction grating juxtaposed with the prism.

In another aspect of the present invention, a light dispersing apparatus disperses a polychromatic input light beam into a plurality of narrow-band output light beams such that each output beam exits the dispersing apparatus with a wavelength dependent exit angle. The apparatus comprises a prism formed of a transparent medium having an index of refraction $n_p$. The prism has a mounting surface, an input surface for receiving the input beam, and an output surface for providing said output beam. The prism provides first dispersing characteristics that vary in response to a change in temperature. The apparatus further comprises a diffraction grating coupled to the mounting surface of the prism. The diffraction grating provides second dispersing characteristics that vary in response to a change in temperature. The variations in the first and second dispersing characteristics cooperate with each other so as to substantially reduce variations in the exit angle of each output beam in response to a change in temperature.

In a further aspect of the present invention, a dispersing apparatus comprises an input face for refracting said input light beam and a reflecting face for reflecting said input light beam subsequent to said refracting of the input light beam by the input face. The apparatus further comprises a diffracting face for diffracting said input light beam subsequent to said reflecting of the input light beam by the reflecting face. The diffracting face provides at least one diffracted beam. The apparatus further comprises an output face for refracting the at least one diffracted beam so as to provide the at least one output light beam.

In one embodiment, the input light beam enters the diffracting face along a path that is substantially juxtaposed with the path of at least one diffracted beam exiting the diffracting face so as to increase the diffraction efficiency of the diffracting face. The input light beam entering the diffracting face partially overlaps the at least one diffracted beam exiting the diffracting face so as to increase the diffraction efficiency of the diffracting face. The reflecting of the input beam at the reflecting surface occurs as a result of the input beam undergoing total internal reflection.

In yet another aspect of the present invention, a method comprises directing a beam of light through a medium along a first path to a diffracting element. The beam is then diffracted through the medium along a second path. After such diffracting, the beam is refracted into a different medium to direct the beam along a third beam path. The first and second beam paths are then altered without substantially altering the third beam path. In one embodiment, the first and second beam paths are altered by changing the temperature of the medium.

Another aspect of the present invention is a method which comprises directing a beam of light through a medium along a first path to a reflecting surface. The beam is then reflected for propogation through the medium along a second path that extends from the reflecting surface to a diffracting element. The beam is then diffracted for propagation through the medium along a third path. After such diffracting, the beam is refracted into a different medium to direct the beam along a fourth beam path.

In one embodiment, diffracting the beam through the medium along a third path comprises diffracting the beam through the medium along a third path such that the third path is substantially juxtaposed with the second path. In one embodiment, the method further comprises altering the first, second, and third beam paths without substantially altering the fourth beam path. In one embodiment, altering the first, second, and third beam paths comprises changing the temperature of the medium.

From the foregoing, it should be apparent that the light dispersing apparatus of the preferred embodiments of the present invention provide improved dispersing characteristics. In particular, in one aspect of the invention, the light dispersing apparatus provides combined dispersing characteristics that remain substantially unchanged in response to a change in temperature. Furthermore, in another aspect of the invention, the light dispersing apparatus provides greater throughput efficiency. These and other objects and advantages of the present invention will become more apparent from the following description taken in conjunction with the accompanying drawings.

DETAILED DESCRIPTION OF THE PREFERRED EMBODIMENT

Reference will now be made to the drawings wherein like numerals refer to like parts throughout. As will be discussed in greater detail below in connection with FIGS. 1 and 2, a light dispersing device 30 is provided with combined dispersing characteristics that are substantially independent of temperature. Furthermore, as will be discussed in connection with FIG. 4, a light dispersing device 130 is provided with improved throughput efficiency.

Figure 1:
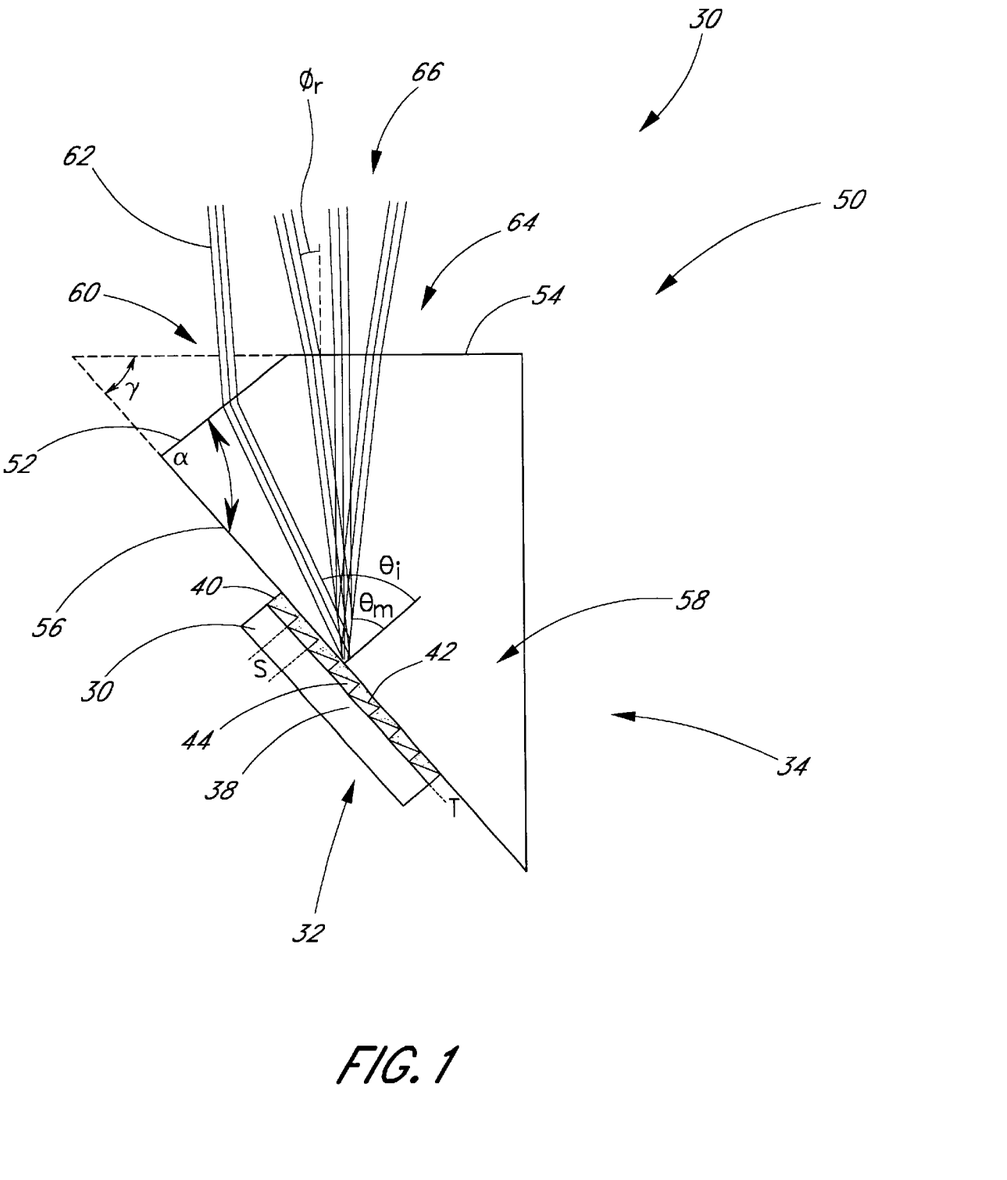
FIG. 1 is a schematic diagram of one embodiment of a light dispersing device that is adapted to provide improved thermal compensation.

FIG. 1 illustrates the light dispersing device 30 in accordance with one aspect of the present invention. The device 30 comprises a diffraction grating 32 attached to a dispersive mounting element 34. In one embodiment, the mounting element 34 is a prism 34. The device 30 is adapted to receive a polychromatic input beam 62 having a plurality of wavelength components at an input surface 52. In response to the input beam 30 entering the input surface 52, the device 30 provides a corresponding plurality of output beams 66 that have spectral bandwidths which are relatively narrow when compared to the combined spectral bandwidth of the input beam 62. In one embodiment, the output beams 66 are substantially monochromatic. The output beams 66 exit an output surface 54 of the device 30 with wavelength dependent exit angles $\phi_r$. The grating 32 is adapted to provide the light dispersing device 30 with first dispersing characteristics and the prism 34 is adapted to provide the light dispersing device 30 with second dispersing characteristics so that the grating 32 and the prism 34 combine to provide the light dispersing device 30 with combined dispersing characteristics having improved thermal stability.

As shown in FIG. 1, in one embodiment, the grating 32 of the light dispersing device 30 comprises a generally planar substrate 30 having a first broad surface 38 and a contoured layer 40 having a contoured surface 42 such that the contoured layer 40 extends from the surface 38 of the substrate 36. The contoured surfaces 42 includes a plurality of narrow grooves 44 which are illustrated in FIG. 1 in an exaggerated manner. The grooves 44 are separated by a relatively small groove spacing s as measured along the plane of the substrate 36. The contoured surface 42 is formed with substantial reflectivity so that the grating 32 functions as a reflecting device.

In one embodiment, the grating 32 is formed using conventional replication techniques such that a mold derived from a master grating is used to imprint the replicated grating 32 with the contoured surface 42 having the plurality of parallel grooves 44. To avoid having the most intense interference maximum associated with the grating 32 be the zeroth-order for which there is no dispersion of light, the grating 32 is preferably blazed to the first order (m=−1). Consequently, the surface of each groove 44 is angled with respect to the plane of the substrate 36. However, it will be appreciated that other types of gratings could be used in other embodiments. For example, non-blazed gratings, holographic gratings, and transmission gratings could be used.

In the preferred embodiment, the diffraction grating 32 is adapted to diffract light in a manner consistent with that of conventional diffraction gratings so as to provide the light dispersing device 30 with the first dispersing characteristics. The diffraction grating 32 is adapted to redirect an input beam having a free space wavelength $\lambda_f$, i.e. the wavelength of the beam as measured in a vacuum, and an incident angle $\theta_i$ with respect to the plane of the diffraction grating so that each output beam is provided with a diffracted angle $\theta_m$ according to equation (1) discussed above. Since the grating is preferably blazed to the first order, the ratio of the diffracted light energy over the incident light energy, otherwise known as the diffraction efficiency, is enhanced for the m=−1 diffraction order.

As shown in FIG. 1, the prism 34 of the light dispersing device 30 includes a plurality of generally planar refracting surfaces 50. The refracting surfaces 50 comprise the input surface 52, the output surface 54, and a mounting surface 56 such that an entrance angle α is defined by the input surface 52 and the mounting surface 56 and such that an exit angle γ is defined by the output surface 54 and the mounting surface 56. The input surface 52 of the prism 34 serves as an input port 60 for the light dispersing device 30 so as to enable the input polychromatic beam 62 to enter the light dispersing device therethrough. The output surface 54 of the prism 34 serves as an output port 64 for the light dispersing device 30 so as to enable the plurality of narrow-band output beams 66 to exit therefrom with wavelength dependent directions. The prism 34 is formed of a transparent material providing an index of refraction $n_p$ that depends on the wavelength of light traveling therethrough.

As shown in FIG. 1, in the preferred embodiment, the grating 32 is mounted directly to the mounting surface 56 of the prism 34 so as to provide the light dispersing device 30 with a diffracting face 58. The grating 32 is positioned adjacent the mounting surface 56 of the prism 34 so that the plane of the substrate 36 of the grating 32 is substantially parallel to the plane of the mounting surface 56 of the prism 34. The contoured surface 42 of the grating 32 is positioned adjacent the mounting surface 56 so that the contoured surface 42 is the diffracting face 58. A relatively thin layer of transparent epoxy 68 having a thickness T is interposed between the grating 32 and the prism 34 in a flush manner such that the epoxy 68 bonds to the contoured surface 42 of the grating 32 and the mounting surface 56 of the prism 34. The epoxy 68 is preferably formed with an index of refraction substantially equal to the index of refraction of the prism so as to prevent light from reflecting at the mounting surface 56.

Although the preferred embodiments of the light dispersing device 30 utilize the separately formed grating 32 which is mounted to the prism 34 as shown in FIG. 1, it will be appreciated that, in another embodiment, an alternative diffracting face could be provided. For example, in one embodiment, the surface 56 of the prism 34 could be contoured in the manner of the contoured surface 42 of the grating 32 of FIG. 1.

Figure 2:
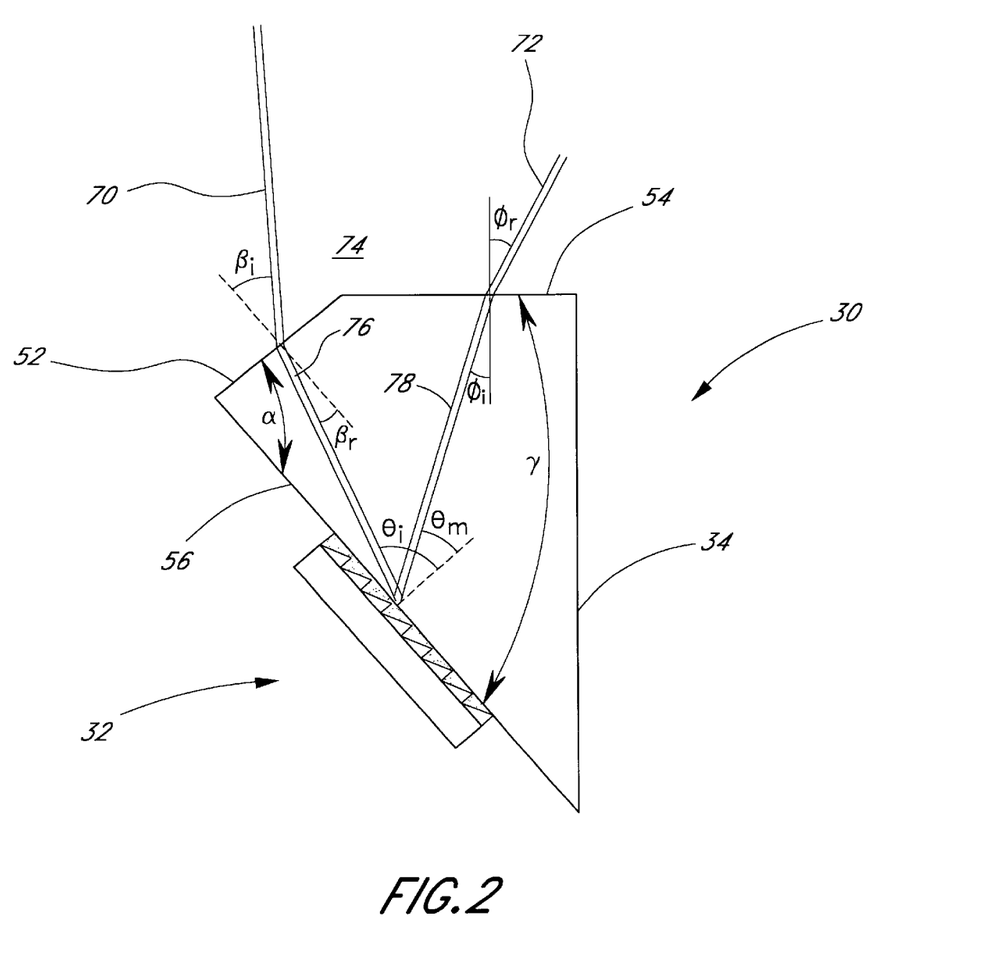
FIG. 2 is schematic diagram illustrating a narrow-band input beam being redirected by the dispersing device of FIG. 1 in a wavelength dependent manner.

Reference will now be made to FIG. 2 which illustrates the combined dispersing characteristics of the light dispersing device 30. In this simplified example, a narrow-band input beam 70, such as a monochromatic beam, having a freespace center wavelength $\lambda_f$ is directed toward the input surface 52 of the light dispersing device 30. The input beam 70 is then redirected by the device 30 so that an output beam 72 with the same freespace center wavelength $\lambda_f$ exits the output surface 54 of the device 30, thereby defining the exit angle $\phi_r$ with respect to a line normal to the output surface 54.

As shown in FIG. 2, the input beam 70 is directed through an incident medium 74, such as air, having an index of refraction $n_i$ toward the input surface 52 of the prism 34 so as to define a first incident angle $\beta_i$ with respect to a line normal to the input surface 52. Upon reaching the input surface 52, the input beam 70 undergoes refraction, thus providing a first refracted beam 76 according to the equation:

$$n_i \sin \beta_i = n_p \sin \beta_r \qquad (4)$$

wherein $\beta_r$ is the angle of refraction with respect to the line normal to the input surface 52.

As shown in FIG. 2, the refracted beam 76 is directed through the prism 34 toward the grating 32 disposed along the mounting surface 56. The beam 76 approaches the mounting surface 56 so as to define a second incident angle $\theta_i$ with respect to a line normal to the plane of the mounting surface 56. The angle $\theta_i$ is related to $\beta_r$ and the entrance angle of the prism, $\alpha$, according to the geometric equation:

$$\theta_i = \alpha - \beta_r \quad (5)$$

As shown in FIG. 2, the diffraction grating 32 diffracts the beam 76 into a diffracted beam 78 that reenters the prism 34 through the mounting surface 56. The diffracted beam 78 defines a diffraction angle $\theta_m$ with respect to a line normal to the mounting surface 56 according to the previously discussed diffraction grating equation, which in this situation is expressed as:

$$s(\sin\theta_i + \sin\theta_m) = \frac{-\lambda_f}{n_p} \quad (6)$$

As shown in FIG. 2, the diffracted beam 78 travels through the prism 34 before exiting the output surface 54 of the prism 34, thus defining a third incident angle $\phi_i$ with respect to a line normal to the output surface 54. The angle $\phi_i$ is related to $\theta_m$ and the exit angle of the prism, $\gamma$, according to the geometric equation:

$$\phi_i = \gamma - \theta_m \quad (7)$$

The diffracted beam 78 undergoes refraction at the output surface 54, thus providing the output beam 72 according to the equation:

$$n_p \sin(\phi_i) = n_r \sin(\phi_r) \quad (8)$$

wherein $n_r$ is the index of refraction of the medium adjacent the output surface 54 and outside the prism 34. In the preferred embodiment, the medium adjacent the output surface 54 is air.

According to equations (4)–(8), it is apparent that the exit angle $\phi_r$ depends on the first incident angle $\beta_i$, the index of refraction of the prism $n_p$, the input angle $\alpha$ of the prism, the groove spacing s of the grating, the exit angle $\gamma$ of the prism, and the free space wavelength $\lambda_f$ of the output beam. This explains why the polychromatic input beam of FIG. 1 is dispersed into the corresponding plurality of narrow-band output beams each having a unique exit angle $\phi_r$. However, since $n_p$ and s often vary in response to a change in temperature, it is likely that the exit angles $\phi_r$ would vary in a substantial manner if not for the thermally compensating design features of the light dispersing device 30 which will now be described in greater detail.

To reduce the variance of the exit angles $\phi_r$ of the light dispersing device 30 in response to a change in temperature, in one embodiment, the light dispersing device 30 is adapted so that the effects of thermally induced changes in $n_p$ are reduced by the effects of thermally induced changes in s. More particularly, according to equations (4)–(8), the light dispersing device 30 is formed of materials selected so that the rate of change of the index of refraction of the prism 34 with respect to a change in temperature (dn/dT), and the rate of change of the groove spacings of the grating 32 with respect to a change in temperature (ds/dT) provide a relatively small rate of change of the exit angle $\phi_r$ with respect to a change in temperature ($d\phi_r$/dT).

For example, in one embodiment, the grating 32 is adapted to have desired values of ds/dT by applying temperature dependent stresses on the contoured layer 40. Such stresses may be the result of thermal expansion of the light dispersing device 30. More particularly, ds/dT of the contoured layer 40 can be selected by choosing the material of the contoured layer 40 with an appropriate coefficient of thermal expansion (CTE). The term ds/dT is further defined by the thermal stresses which act on the contoured layer 40. For example, since the contoured layer 40 is directly adhered to the substrate 36, the substrate 36 can be adapted to exert a thermal stress on the contoured layer 40 that depends on the CTE of the substrate 36. Since the contoured layer 40 is directly adhered to the epoxy 68, the epoxy 68 can be adapted to exert a thermal stress on the contoured layer that depends on the CTE of the epoxy. Additionally, since the prism 34 is adhered to the epoxy 68, the prism can be adapted to indirectly exert a thermal stress on the contoured layer 40 through the epoxy 68, wherein the thermal stress exerted on the contoured layer 40 depends on the elastic modulus of the epoxy 68, the thickness of the epoxy 68, and the CTE of the prism 38.

In one embodiment, the groove spacing s of the grating 32 is maintained at a relatively constant value in response to a change in temperature. This is accomplished by selecting the material of the substrate 36 with a relatively small CTE. In one embodiment, the epoxy 68 is formed of highly elastic material with a sufficient thickness so that the grating 32 is essentially isolated from the thermal expansion of the prism 34. The material of the prism 34 may be selected so as to have a relatively small CTE.

In one embodiment, the light dispersing device 30 is formed so that ds/dT of the grating 32 is substantially zero and so that dn/dT of the prism is substantially non-zero. To provide thermal compensation, the light dispersing device 30 is formed with appropriate values of $\alpha$, $\gamma$ and $n_p$ so that the effects of the substantially non-zero dn/dT on $\phi_r$ are substantially nullified according to equations (4)–(8). For example, if the index $n_p$ of the prism increases, then the refracted angle $\beta_r$ decreases according to equation (4) and the incident angle $\theta_i$ decreases according to equation (5). Correspondingly, the diffracted angle $\theta_m$ is enlarged according to equation (6) and the incident angle $\phi_i$ is reduced according to equation (7). The reduction in $\phi_i$ is selected so that the product of $n_p$ times $\sin(\phi_i)$ is relatively unchanged so that $\phi_r$ is substantially maintained according to equation (8).

Thus, it will be appreciated that a person skilled in the art has substantial latitude in designing the light dispersing device 30 so that $d\phi_r$/dT is reduced. In one embodiment, the material and shape of the light dispersing device is selected so that the effects of a non-zero ds/dT offset the effects of a non-zero dn/dT. In another embodiment, the light dispersing device is adapted with a substantially zero ds/dT and a substantially non-zero dn/dT such that $\phi_r$ is relatively unchanged by the changing $n_p$.

Thus, it will be appreciated that the light dispersing device 30 is able to disperse light in a manner that is more desirable than that of dispersing devices known in the art. By countering the effects of the thermally dependent index of refraction of the prism 34 with the effects of the thermally dependent groove spacings of the grating 32, the exit angles $\phi_r$ of the light dispersing device 30 are less sensitive to a change in temperature. Furthermore, in one embodiment, the light dispersing device 30 is adapted so that the groove spacing s of the grating 32 is relatively insensitive to a change in temperature and so that the index of refraction $n_p$ of the grating 32 is substantially affected by a chance in temperature. However, in this embodiment, the composition and shape of the prism 34 is selected so that the exit angles $\phi_r$ of the output beams 66 are substantially independent of the temperature of the light dispersing device 30.

Figure 3:
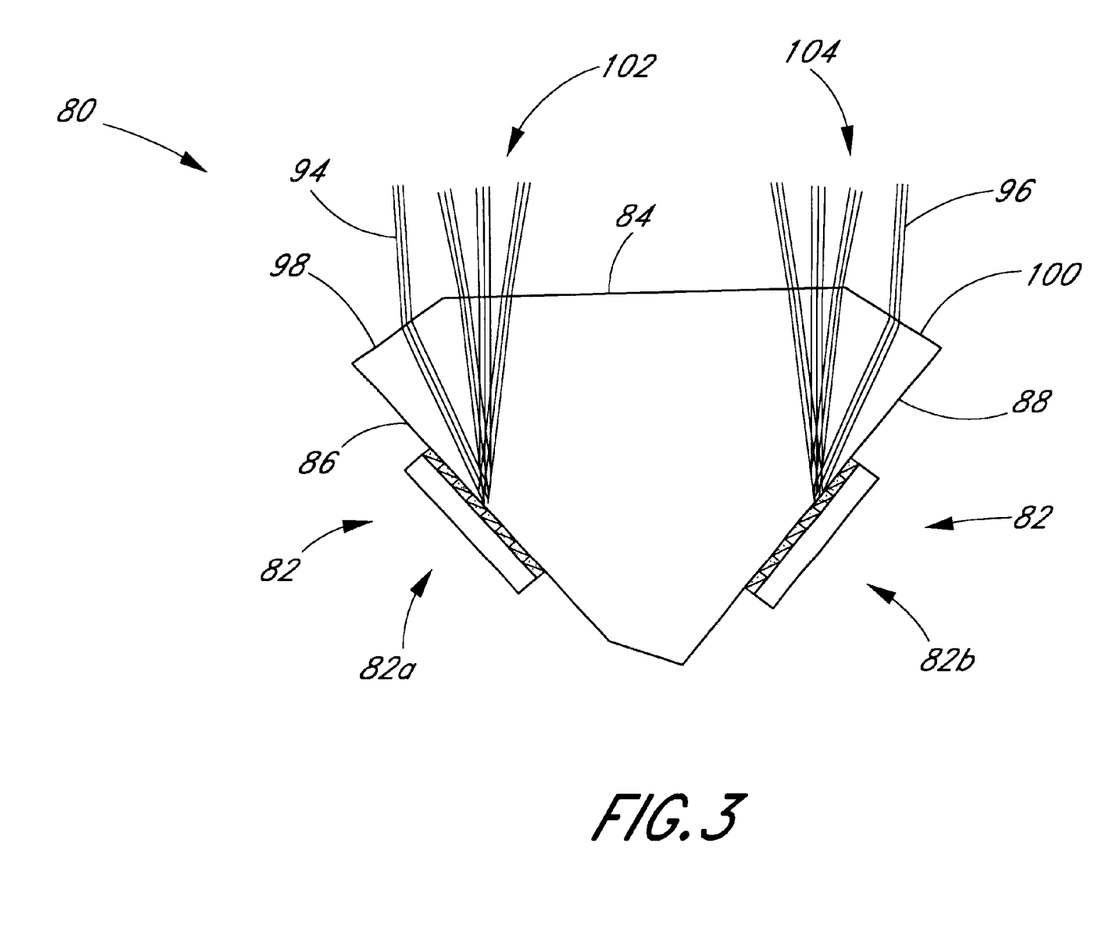
FIG. 3 is a schematic diagram of a light dispersing assembly comprising a pair of light dispersing devices that are similar to the light dispersing device of FIG. 1.

Reference will now be made to FIG. 3 which illustrates a light dispersing assembly 80 in accordance with another aspect of the present invention. The assembly 80 of FIG. 3 comprises a plurality of light dispersing devices 82 that are each substantially similar to the light dispersing device 30 of FIG. 1 such that the dispersing devices 82 share a single mounting element 84. In the preferred embodiment, the mounting element 84 of the dispersing assembly 80 is a prism 84 having first and second mounting surfaces 86, 88. The assembly 80 further comprises a first and second diffraction grating 90, 92 respectively mounted to the mounting surfaces 86, 88 of the prism 84 in the manner of the light dispersing device 30 of FIG. 1 so as to provide matching first and second dispersing devices 82a, 82b. Furthermore, the dispersing assembly 80 is adapted so that a first and second input beam 94, 96 respectively impinging a first and second input surface 98, 100 of the assembly 80 are dispersed into a first and second plurality of output beams 102, 104. Moreover, by adapting the assembly 80 with the thermally compensating features of the device 30 of FIG. 1, the output beams 102, 104 respectively exit a first and second output surface 106,108 of the assembly 80 with wavelength dependent directions that are relatively unaffected by a change in temperature.

It will be appreciated that the assembly 80 provides many advantages. In particular, since the first and second diffraction gratings 90, 92 are fixedly mounted to the singular prism 84 during the manufacturing process, the gratings 90, 92 are maintained in a fixed alignment with respect to each other. Thus, when compared to dispersing devices that utilize a plurality of uncoupled diffraction gratings, the dispersing assembly 80 of FIG. 3 is less likely to be affected by mechanical vibrations or by misguided attempts to realign the dispersing assembly 80. Furthermore, relatively precise alignment of the first and second gratings 90, 92 can be realized by simply aligning the prism 84 with the input beams 94, 96 such that the input beams 94, 96 enter the input surfaces 94, 96 of the prism 80 with desired incident angles. Consequently, the dispersing assembly 80 facilitates directing the output beams 102,104 with relatively small directional errors.

Figure 4:
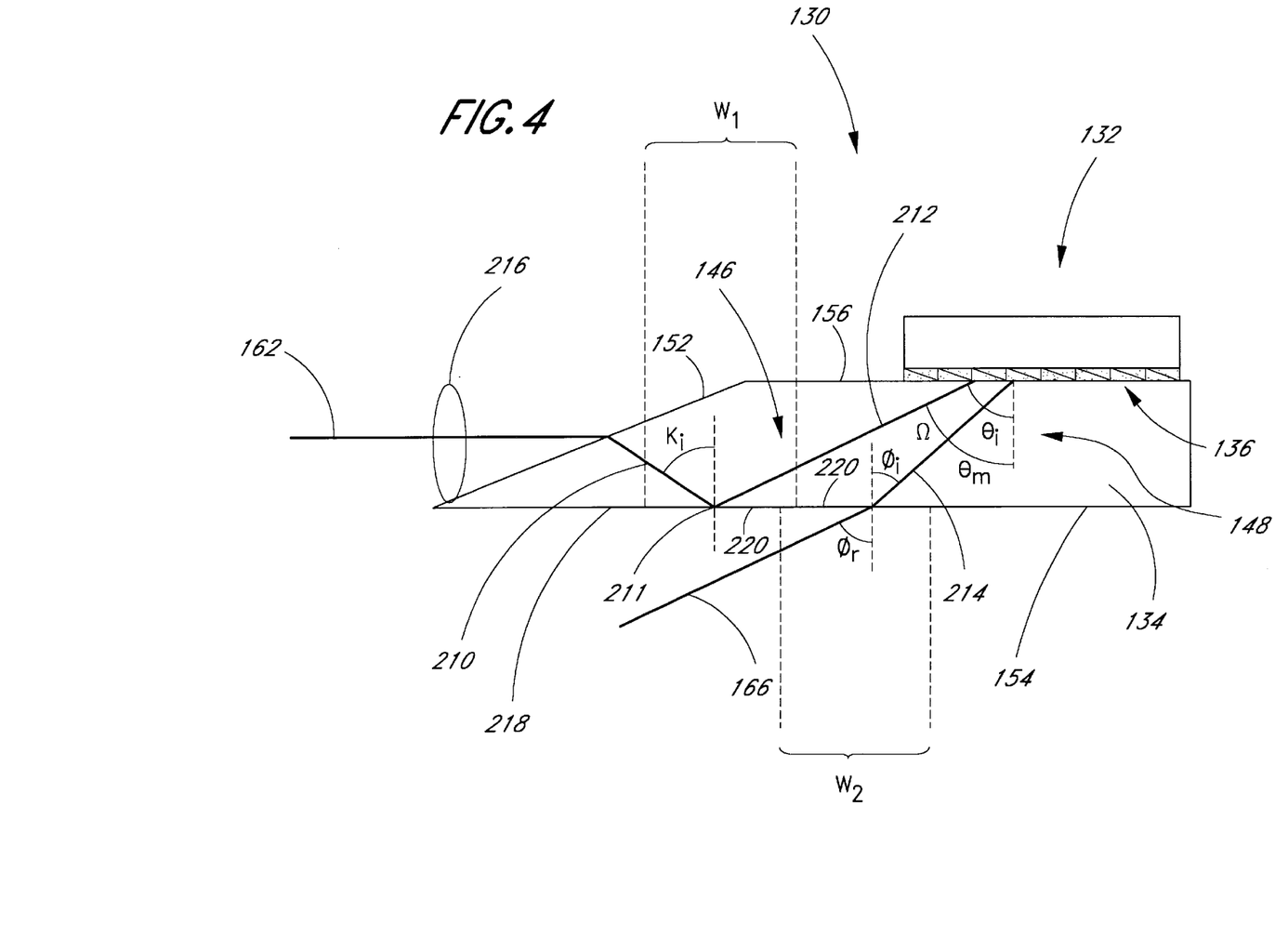
FIG. 4 is a schematic diagram of a light dispersing device that is adapted to provide improved throughput efficiency.

Reference will now be made to FIG. 4 which illustrates one embodiment of the light dispersing device 130 which is adapted to provide an improved throughput efficiency by reducing the angular separation between incident and diffracted beams entering and exiting a diffraction grating 132 of the dispersing device 130.

As shown in FIG. 4, the device 130 is similar to the device 30 of FIG. 1. In particular, the device comprises a prism 134 having an input surface 152, an output surface 154 and a mounting surface 156. The device 130 further comprises the diffraction grating 132 similar to that of FIG. 1 so as to provide a diffracting face 136. In particular, the device 130 is mounted to the mounting surface 156 of the prism 134 such that an input light beam 162 impinging the input surface 152 of the prism 134 is subsequently diffracted by the diffraction grating 132 so as to provide at least one output beam 166 that exits the output surface 154. Furthermore, the device 130 is adapted with the thermally compensating features described previously in connection with the device 30 of FIG. 1 so as to provide substantially uniform dispersing characteristics in response to a change in temperature. However, as will be described in greater detail below, the device 130 defines input and output beam paths 146,148 within the prism 134 such that improved diffraction efficiency of the grating 132 is realized.

As shown in FIG. 4, the prism 134 is adapted so that the input light beam 162 entering the input surface 152 of the prism 134 travels within the prism 134 from the input surface 152 to the mounting surface 156 along the input beam path 146. In particular, the input beam path 146 comprises a first length 210 that extends toward a reflecting location 211 positioned within the prism 134. The input beam path 164 further comprises a second length 212 that extends from the reflecting location 211 toward the diffracting face 136 so that the input beam 146 defines an incident angle $\theta_i$ with respect to a line normal to the diffracting face 136.

In one embodiment, reflection of the input beam 162 at the reflecting location 211 occurs as a result of total internal reflection (TIR). In particular, the first length 210 of the input beam path extends toward a first exterior surface 218 of the prism 134 and defines an incident angle $\kappa_i$ with respect to a line normal to the first surface 218. The prism 134 is adapted so that the incident angle $\kappa_i$ is greater than the critical angle at the first surface 218 defined by:

$$\sin^{-1}(n_p/n_{out})$$

wherein $n_{out}$ is the index of refraction of the medium outside the prism 134 adjacent the first surface 218 and wherein $n_p$ is the index of refraction of the prism 134.

As shown in FIG. 4, the first length 210 of the input beam path 146 extends from the input surface 152 to the output surface 154. Upon reaching the output surface 154, the input beam 162 undergoes TIR thereat so as to be redirected along the second length 212 of the input beam path 146 that extends from the output surface 154 toward the mounting surface 156.

The prism 132 is adapted so that the output beam 166 originating at the diffracting face 136 travels within the prism 134 from the diffracting face 136 to the output surface 154 along the output beam path 148. The output beam path 148 comprises a first length 214 that extends from the mounting surface to the output surface 154 along a direction defined by the diffraction angle $\theta_m$ with respect to the diffracting face 136 according to equation (6). The first length 214 of the output beam path 148 further defines an incident angle $\phi_i$ with respect to the output surface 154. The incident angle $\phi_i$ defined by the output beam path at the output surface is less than the critical angle so that TIR does not occur. In one embodiment, an anti-reflective coating is deposited along the output surface 154 of the prism 132 so as to enhance transmission of the output beam 166 through the output surface 154 without frustrating the TIR of the input beam 162.

The device 130 is adapted so that the second length 212 of the input beam path 146 and the first length 214 of the output beam path 148 define an angle $\Omega$ which is relatively small. In one embodiment, $\Omega$ is less than 5 degrees. Since the angle $\Omega$ is smaller than that which is typically provided by prior art devices, the diffraction grating 132 is able to realize an improved diffraction efficiency. Furthermore, since the input and output beams 162, 166 respectively enter and exit the device through the spatially separated input and output surfaces, 152, 154 the beams are less likely to be affected by closely positioned components.

For example, in one embodiment, a lens 216 is positioned adjacent the input surface 152 of the device 130 so as to be positioned in the path of the input beam 162 as shown in FIG. 4. However, since the output beam 166 exits the output surface 154 and travels therefrom along a region which is substantially separated from the input surface 152, the output beam 166 does not enter the lens 216. Consequently, the output beam 166 is not affected by the lens 216.

In one embodiment, the device 130 is adapted so that the input and output beams 162 and 166 having ellipsoidal cross sectional shapes partially overlap each other at the output surface 154 of the prism 134. Because the input beam 162 has an extended width, the input beam 162 strikes the output surface 154 along a first incident region 220 having a width $W_1$. Likewise, because the output beam 166 has an extended width, the output beam 166 strikes the output surface 154 along a second incident region 222 having a width $W_2$. Since the angle $\Omega$ between the input and output beams 162 and 166 is relatively small, the second incident region partially overlaps the first incident region as shown in FIG. 4.

Thus, it will be appreciated that the light dispersing device 130 of FIG. 4 provides the advantage of increased throughput efficiency. This advantage is realized by providing the input and output beam paths 146, 148 that define a relatively small angle $\Omega$ at the diffracting face 136 which increases the diffraction efficiency of the grating 132. For example, it has been determined that the diffraction efficiency of the diffraction grating 132 can increase by as much as 10% if the angle $\Omega$ is reduced from 15° down to 5°. Furthermore, this advantage is realized without requiring the input and output beams 162, 166 to pass nearby each other outside of the prism. Consequently, the device can be used in conjunction with an additional optical element such that the additional element can be adapted to influence one of the beams without influencing the other.

Figure 5:
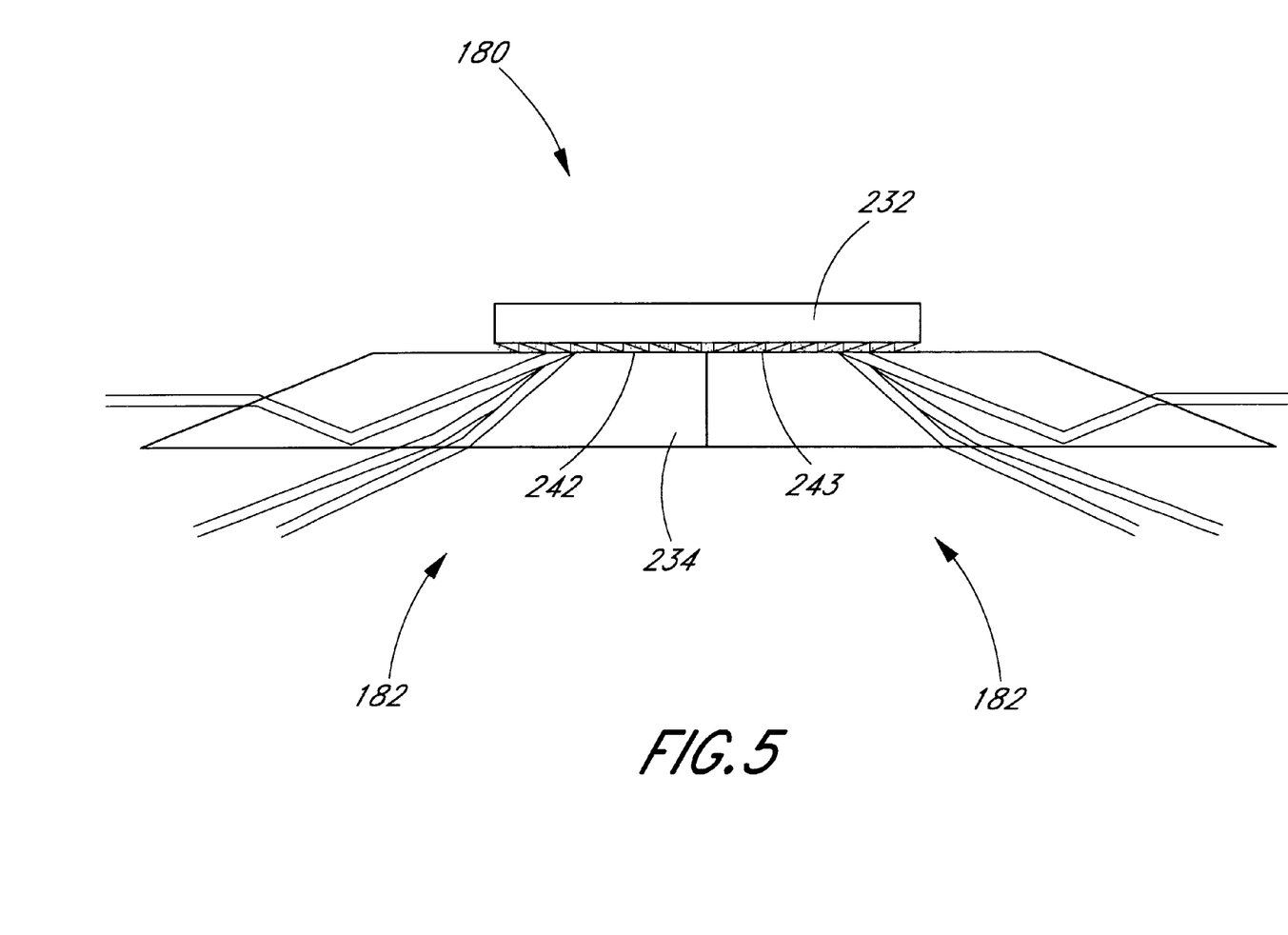
FIG. 5 is a schematic diagram of a light dispersing assembly comprising a pair of light dispersing devices that are similar to the light dispersing device of FIG. 4.

Reference will now be made to FIG. 5 which illustrates one embodiment of a light dispersing assembly 180 which comprises a plurality of light dispersing devices 182 that are each substantially similar to the light dispersing device 130 of FIG. 4. In one embodiment, the assembly comprises a single prism 234 and a single diffraction grating 232 adapted so as to provide separate diffracting faces 242 and 243.

Thus, the assembly 180 provides the advantages of the device 30 of FIG. 1, the assembly 80 of FIG. 2, and the device 130 of FIG. 3. In particular, the assembly 180 provides improved thermal stability and improved diffraction efficiency. Furthermore, since the dispersing devices 182 share the same prism 234, the dispersing devices 182 of the assembly 180 can be aligned with each other in a more reliable manner. Moreover, since all of the elements of the assembly 180 are rigidly attached together, the assembly 180 is less likely to become misaligned during use. Additionally, since the assembly 180 includes the singular grating 232, alignment between the dispersing devices 182 of the assembly 180 is further simplified, thus enabling the assembly 180 to be manufactured at a reduced cost.

Although the preferred embodiments of the present invention has shown, described and pointed out the fundamental novel features of the invention as applied to these embodiments, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A dispersing apparatus for dispersing a polychromatic light beam into a plurality of narrow band output light beams, the apparatus comprising:

a planar input face which refracts said polychromatic light beam at angles which vary with temperature;

a diffracting element separated a distance from said planar input face, said refracted beam propagating over said distance to said diffracting element, which receives said refracted beam along an optical path and divides said refracted beam into said narrow band output beams, said diffracting element directing said output beams along respective beam paths, each of which is at an angle relative to the refracted beam path and relative to the other output beam paths; and an output face which refracts said output light beams, said diffracting element compensating for said angular variations at said input face such that said output light beams exit the dispersing apparatus refracted at respective angles which are substantially independent of said angular variations.

2. The apparatus of claim 1, wherein said input face is on a prism.

3. The apparatus of claim 2, wherein said diffraction element comprises a diffracting face on the prism.

4. The apparatus of claim 1, wherein said input and output faces are formed by a prism, and wherein said diffracting element is a diffraction grating juxtaposed with the prism.

5. The apparatus of claim 4, wherein said diffraction grating is a reflection diffraction grating.

6. The apparatus of claim 5, wherein said diffraction grating is fixedly mounted to said prism.

7. The apparatus of claim 1, wherein said output face comprises a planar surface separated a distance from said diffracting element.

8. The apparatus of claim 1, wherein said diffraction element is disposed on a substantially planar substrate.

9. The apparatus of claim 8, wherein said diffraction element is adjacent a planar mounting surface.

10. The apparatus of claim 1, wherein said diffraction element is adjacent a substantially planar mounting surface on the prism.

11. A light dispersing apparatus for dispersing a polychromatic input light beam into a plurality of narrow-band output light beams such that each output beam exits the dispersing apparatus with a wavelength dependent exit angle, the apparatus comprising:

a prism formed of a transparent medium having an index of refraction $n_p$, said prism comprising a mounting surface, an input surface which receives said input beam, and an output surface which outputs said output beam, said prism providing first dispersing characteristics that vary in response to a change in temperature; and a diffraction grating coupled to the mounting surface of the prism, said diffraction grating providing second dispersing characteristics that vary in response to a change in temperature, wherein said variations in the first and second dispersing characteristics cooperate with each other so as to substantially reduce variations in the exit angle of each output beam in response to a change in temperature.

12. The apparatus of claim 11, wherein the second dispersing characteristics are defined by $n_p$.

13. The apparatus of claim 12, wherein the diffraction grating comprises a substrate having a surface, said diffraction grating further comprising a contoured layer disposed along the surface of the substrate.

14. The apparatus of claim 13, wherein the contoured layer is blazed.

15. The apparatus of claim 13, wherein the second dispersing characteristics are further defined by the shape of said contoured layer.

16. The apparatus of claim 15, wherein said contoured layer experiences a change in shape in response to a change in temperature.

17. The apparatus of claim 16, wherein said contoured layer is exposed to at least one temperature dependent stress.

18. The apparatus of claim 17, wherein the at least one temperature dependent stress comprises a first stress applied by the substrate of the diffraction grating.

19. The apparatus of claim 18, wherein the at least one temperature dependent stress further comprises a second stress applied by the prism.

20. The apparatus of claim 19, further comprising a layer of epoxy interposed between the prism and the contoured layer of the diffraction grating in a substantially flush manner so that the second stress applied by the prism onto the contoured layer is applied indirectly through the layer of epoxy.

21. The apparatus of claim 20, wherein the layer of epoxy is adapted so as to reduce the second stress.

22. The apparatus of claim 12, wherein $n_p$ varies with temperature.

23. The apparatus of claim 22, wherein the shape of the contoured layer is substantially maintained in response to a change in temperature.

24. A dispersing apparatus for dispersing a polychromatic light beam into a plurality of narrow band light beams, the apparatus comprising:

a planar input face which receives said polychromatic light beam and refracts said polychromatic light beam, thereby dividing said polychromatic light beam into said plurality of narrow band light beams directed along a first plurality of beam paths disposed at angles which vary with temperature;

a diffracting element separated a distance from said planar input face, said plurality of narrow band light beams propagating over said distance to said diffracting element, which diffracts said plurality of narrow band light beams along a second plurality of beam paths, said plurality of narrow band light beams thereby being directed at angles relative to said first plurality of beam paths and relative to each other; and an output face which refracts said plurality of narrow band light beams, said diffracting element compensating for said temperature-induced angular variations at said planar input face such that said light beams exit the dispersing apparatus refracted at respective angles which are substantially independent of said temperature-induced angular variations.

25. The apparatus of claim 24, wherein said diffracting element comprises a planar substrate having a contoured surface.

26. The apparatus of claim 25, wherein said diffracting element is adjacent a planar mounting surface.

27. The apparatus of claim 24, wherein said diffracting element comprises a plurality of parallel grooves formed on a surface.

28. The apparatus of claim 27, wherein said plurality of parallel grooves have a groove spacing, s.

29. The apparatus of claim 24, wherein said output face comprises a planar surface separated a distance from said diffracting element.

30. A dispersing apparatus for dispersing light comprising multiple wavelengths, the apparatus comprising:

a planar input face which refracts said light at angles which vary with temperature;

a diffracting element separated a distance from said planar input face, said light propagating over said distance to said diffracting element, which diffracts said light; and an output face which refracts said light, wherein said planar input face, said diffracting element, and said output face together disperse said light comprising multiple wavelengths into a plurality of narrow band output beams having different wavelengths, said diffracting element compensating for said temperature-induced angular variations at said planar input face such that said narrow band output beams exit the dispersing apparatus refracted at angles which are substantially independent of said temperature-induced angular variations.

31. The apparatus of claim 30, wherein said diffracting element comprises a planar substrate having a contoured surface.

32. The apparatus of claim 31, wherein said diffracting element is adjacent a planar mounting surface.

33. The apparatus of claim 30, wherein said diffracting element comprises a plurality of parallel grooves formed on a surface.

34. The apparatus of claim 35, wherein said plurality of parallel grooves have a groove spacing, s.

35. The apparatus of claim 30, wherein said output face comprises a planar surface separated a distance from said diffracting element.

* * * * *